Figure 1:
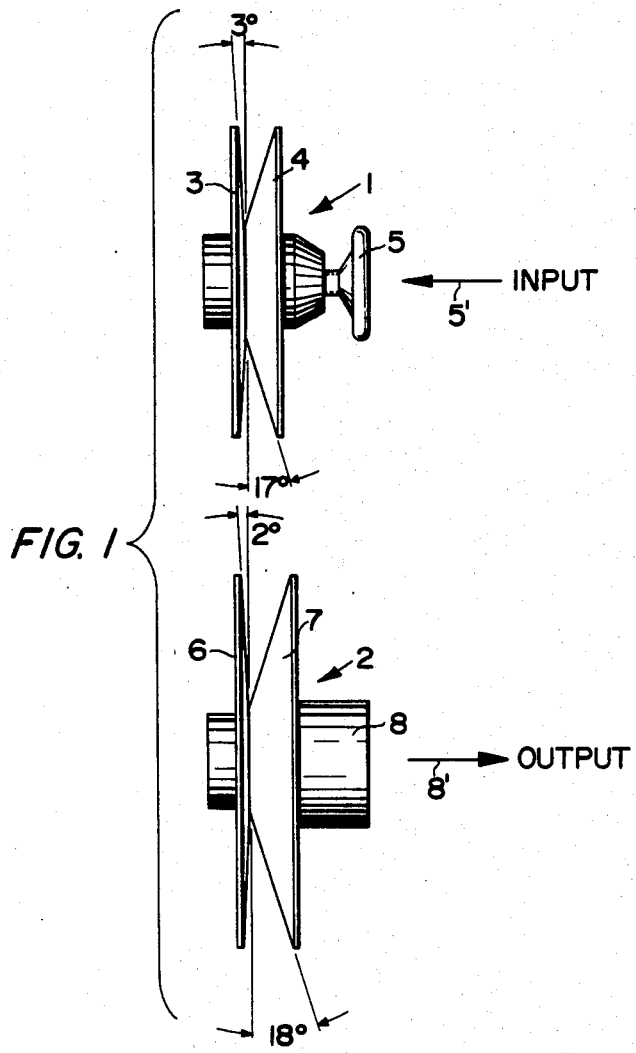

US Patent Number: 4,473,367
Date of Patent: Sep. 25, 1984
Inventor: Hans Wiegelmann, Hess, Fed. Rep. of Germany
Assignee: Emil und Adolf Becker GmbH & Co. KG, Hess, Fed. Rep. of Germany

[54] V-BELT DRIVE UNIT

[21] Appl. No.: 374,006
[22] Filed: May 3, 1982

[30] Foreign Application Priority Data
Oct. 17, 1981 [DE] Fed. Rep. of Germany ....... 3141299

[51] Int. Cl.³ .............................................. F16G 5/06
[52] U.S. Cl. ........................................ 474/265; 474/19
[58] Field of Search ....................... 474/8, 25, 19, 148, 474/167, 174, 176, 179, 265

[56] References Cited

U.S. PATENT DOCUMENTS

| | | | |
|---|---|---|---|
| 2,905,005 | 9/1959 | Miner | 474/19 |
| 3,365,967 | 1/1968 | Moogk | 474/19 |
| 3,628,389 | 12/1971 | Wiegelmann | 474/19 |
| 3,656,359 | 4/1972 | Dorf et al. | 474/167 X |
| 3,783,705 | 1/1974 | Moogk | 474/265 |
| 3,811,331 | 5/1974 | Moogk | 474/19 |
| 4,299,587 | 11/1981 | Imamura | 474/263 X |

Primary Examiner—Lawrence J. Staab
Assistant Examiner—Dwight G. Diehl
Attorney, Agent, or Firm—W. G. Fasse; D. H. Kane, Jr.

[57] ABSTRACT

A V-belt drive unit has an input pulley and an output pulley wherein one V-belt contacting pulley flank of each pulley extends at a small angle or substantially radially relative to the respective rotational axis of the pulley. the other V-belt contacting pulley flank is inclined at a larger angle relative to the respective rotational axis. The V-belt has respective flanks which are inclined at an angle which is at least one degree larger than the respective flank angle of the corresponding pulley. Further, the flank angles of the power input pulley differ from the corresponding flank angles of the respective power output pulley of a drive unit. The opening angle formed by the two flanks of a pulley is larger in the power output pulley than in the power input pulley. These features provide a substantial increase in the power transmission capacity of such drive units as compared to previous drive units of this type.

8 Claims, 2 Drawing Figures

V-BELT DRIVE UNIT

CLAIM TO PRIORITY

The present application is based on German Ser. No. P 31 41 299.8, filed in the Federal Republic of Germany on Oct. 17, 1981. The priority of the German filing date is claimed for the present application.

BACKGROUND OF THE INVENTION

The present invention relates to a V-belt drive unit comprising asymmetric or nonsymmetric V-belt pulleys. Each pulley has side walls hereinafter referred to as belt contacting flanks or pulley flanks or simply as flanks. One flank of a pulley extends approximately radially relative to the rotational axis of the pulley. The other flank extends at a larger angle relative to said rotational axis. Further, the sloping angles of these pulley flanks relative to the radial direction are smaller by at least one degree than the corresponding sloping angles of the V-belt flanks.

German Patent (DE-PS) No. 2,001,623 discloses a V-belt drive unit of the just described type. In the prior art nonsymmetric or asymmetric V-belt drive units the input pulleys and the output pulleys are of the same construction relative to each other. Stated differently the flanks in the prior art drive unit have the same sloping angle on one side of the input and output pulley and also the same sloping angle on the other side of the input and output pulley.

The prior art V-belt drive unit is constructed for smaller transmission ratios. Stated differently, the prior art unit is quite suitable for the transmission of a given power up to a certain pulley diameter. However, there is a need for asymmetric or nonsymmetric V-belt drive units having larger power ratings for the transmission of respectively larger powers. For this purpose it is necessary to increase the pulley diameter. Prior art V-belt drive units as mentioned above are not suitable for such larger power ratings or are not adapted for the transmission of such larger powers. It has been found that by increasing the running diameter in a prior art V-belt drive unit the asymmetric V-belt itself is subject to a twisting, whereby the power transmission is limited.

OBJECTS OF THE INVENTION

In view of the foregoing it is the aim of the invention to achieve the following objects singly or in combination:

to modify a V-belt drive unit of the type described in such a manner that by increasing the pulley diameters larger powers may be transmitted;

to construct such a pulley system or drive unit in such a manner that the V-belt will have an opportunity to assume a slanted position without necessarily twisting; and to select the sloping angles of the flanks of the input and output pulley of a power transmission system of this type in such a manner that the mentioned twisting is altogether avoided.

SUMMARY OF THE INVENTION

According to the invention a V-belt drive unit or system is so constructed that the V-belt pulleys, or rather the pulley flanks thereof which correspond to each other on the input and output side of the system, have different sloping angles, whereby the opening angle on the output end of the system is larger than on the input end of the system. This critical selection of the sloping angles as taught herein does not avoid any alignment errors in a system in which the pulley halves or walls are axially adjustable. However, the present teaching gives the V-belt the possibility to adapt itself to a slanted position in such a manner that the steeper running flank of the V-belt completely engages with an intimate contact the running surface of the steeper pulley half or flank.

The theoretic ideal condition requires that the sloping angle of the steeper flank of the pulley should be zero degrees relative to the radial direction. In other words, the sloping angle should be 90° relative to the rotational axis of the pulley. However, for practical reasons this cannot be realized. Therefore, the selection of the sloping angle of the two flanks or pulley halves is of critical importance.

Thus, the aim of the invention is achieved with good results if the sloping angle of the pulley halves or flanks on the input end is 3° and 17° respectively and on the power output side 2° and 18° respectively relative to the radial or vertical direction to the rotational pulley axis.

In the above mentioned prior art V-belt drive system the just mentioned angles on the input side are the same as those on the output side, whereby the sloping angle of the steeper pulley flank is within the range of 1° to 2° and the sloping angle of the pulley flank which is more inclined is within the range of 18° to 19°.

Figure 2:
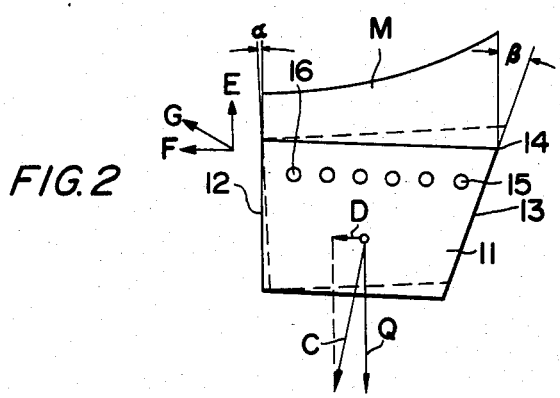

BRIEF FIGURE DESCRIPTION:

In order that the invention may be clearly understood, it will now be described, by way of example, with reference to the accompanying drawings, wherein:

FIG. 1 is a schematic top plan view onto a V-belt drive unit according to the invention, whereby the V-belt itself has been omitted; and FIG. 2 is a sectional view through a V-belt suitable for the present purposes and illustrating the forces which are effective on the V-belt.

DETAILED DESCRIPTION OF A PREFERRED EXAMPLE EMBODIMENT AND OF THE BEST MODE OF THE INVENTION

Referring to FIG. 1, the present V-belt drive unit comprises on its input side a V-belt pulley 1 and on its output side a V-belt pulley 2. The pulleys 1 and 2 are operatively interconnected by a nonsymmetric or asymmetric V-belt shown in FIG. 2. The input pulley 1 comprises a first pulley half 3 which is rigidly connected to a drive shaft in a force transmitting manner and a further pulley half 4 which is adjustable in its spacing from the first mentioned pulley half 3. The pulley half 3 has a pulley flank with a steep angle relative to the radial direction extending perpendicularly to the longitudinal rotational axis of the pulley 1. That angle relative to the radial direction is, for example, 3° as shown in FIG. 1. The belt contacting pulley flank of the pulley half 4 may be adjusted in its spacing relative to the pulley half 3, for example, by means of a threaded spindle rotatable by an adjustment hand wheel 5 movable back and forth in the axial direction as indicated by the arrow 5'. With this adjustment it is possible to vary or adjust the transmission ratio of the drive unit. The input shaft is also represented merely by the arrow 5'.

The output pulley 2 comprises a first half pulley disk 6 with a steep pulley flank forming an angle with the radial direction of, for example 2°, and a second pulley half disk 7 having a pulley flank forming an angle with the radial direction of 18°, for example. The left pulley half 6 is rigidly connected to the power output shaft 8' indicated merely as an arrow. The right pulley half 7 is connected to the output shaft in a torque transmitting manner, but slidable in the axial direction. For this purpose a conventional adjustment device 8 is operatively connected to the pulley half 7 for an automatic adjustment of the correct axial spacing between the fixed pulley half 6 and the movable pulley half 7.

Prior art V-belts may be used in operating the present drive system. Such V-belts are, for example, disclosed in the above mentioned German Pat. No. 2,001,623 which incidentally corresponds to U.S. Pat. No. 3,783,705. V-belts of this type have a steeper flank with a sloping angle in the range of 3° to 5° and a less steep flank with a sloping angle in the range of 15° to 17°. According to the invention however, the angles defining the flanks of the pulleys must be properly correlated to the respective angles defining the flanks of the V-belt.

According to the invention, the sloping pulley flank angles of the input pulley on the steeper side correspond to 3° and to 17° for the less steep sloping pulley flank on the input side. On the other hand, the steeper pulley flank on the output side has an angle of only 2° as compared to the 3° on the input side, while the pulley flank of the pulley half 7 on the output side has a sloping angle of 18°, namely slightly larger than the sloping angle of 17° of the corresponding pulley half on the input side.

It has been found that it is desirable or suitable in view of the just outlined angular relationship to use V-belts which are reinforced by tension threads or strands having a high tensile strength. Simultaneously, the sloping angles of the flanks of the V-belt should be arranged accordingly. Reinforcing strands or threads in the V-belts having the desired high tensile strength may, for example, be made of an aromatic polyamide fiber sold under the Trademark "KEVLAR" (RTM), manufactured by DuPont and Company.

It is well known in this art that all types of V-belts independently of the nature of their cross-sectional profile have a tendency to stretch or expand during the first operational hours under full load. In order to reduce such initial stretching, it has been suggested to reinforce the V-belts by tensile threads or strands embedded in the V-belt and made of fiberglass. However, even with such reinforcement a small initial stretching must be taken into account.

Referring to FIG. 2 the tensile threads or strands 15 are especially exposed to such initial stretching adjacent to the flank 13 of the V-belt 11 having the larger less step sloping angle $\beta$. Please see in this connection FIG. 1 of German Pat. No. 2,001,623. Heretofore the result of such nonuniform tensile loading was that, especially in connection with excessive loads of short duration the V-belt was twisted in its profile or cross-section.

Present FIG. 2 also shows the increased loading in the form of the moment or torque over the width of the V-belt as represented by the surface area M.

The invention avoids the above mentioned twisting, especially also during the initial ten hours of a full load operation. The invention accomplishes this in that all the reinforcing tension strands are sequentially stretched completely uniformly. For this purpose the invention dimensions the flank angles of the asymmetric V-belt 11 in such a manner that during the initial hours under full load operation a slanted position of the V-belt in the opposite direction is enforced. This feature is achieved by making the flank angle $\alpha$ of the V-belt 11, depending on the size of the load to which the belt is to be exposed, larger by at least 1° to 3° as compared to the corresponding sloping angle of the respective steeper pulley flanks. These steeper pulley flank sloping angles are within the range of about 1° to 3° due to the low friction run-in or run-out of the V-belt into and out of the respective pulley. Thus, the flank angle $\alpha$ of the V-belt 11 would be about 3° to 5°. The flank angle $\beta$ of the V-belt 11 must also be larger by 1° to 3° than the other less steep sloping angle of the less steep pulley flanks. In other words, the flank angle $\beta$ of the V-belt 11 will be between 18° and 19° since the less steep sloping angle of the pulley flanks is between 17° and 18°.

Referring further to FIG. 2, due to the excessively dimensioned flank angles of the asymmetric V-belt according to the invention, the axial load Q will produce during operation a force component E due to the occurrence of the lateral forces F and G. The force component E thus causes the V-belt to assume a slanted position because the force component E opposes the force component D.

Due to this dimensioning of the flank angle $\beta$ for the flank 13 and the flank angle $\alpha$ for the flank 12 of the V-belt 11 it is achieved that first the lateral tensile strands 16 are stretched. Thereafter, the intermediate strands are stretched, and finally, the lateral strands 15 are uniformly stretched until a permanent stretching or expansion is imparted on the V-belt. The size of the stretching corresponds to the size of the power transmission or to the size of the axial load Q. A slanting or twisting in the clockwise direction toward the outer strands 15 is prevented unless the V-belt is exposed to an extraordinarily large tension load resulting from an extraordinarily large overload of the V-belt. Practical comparing tests have shown that the V-belt drive unit according to the invention with the flank angles as disclosed herein for the pulleys is capable of transmitting loads which are larger by about 20% to 30% as compared to systems disclosed in the above mentioned German Pat. No. 2,001,623. Further, it has been found that the V-belts dimensioned according to the invention achieve a substantially higher operational life than the V-belts used in a drive system as disclosed in German Pat. No. 2,001,623.

According to the invention the V-belt takes up a completely straight running position in its V-groove after the first ten hours of operation under full load. During the further operational hours the V-belt flanks 12 and 13 will completely hug the respective pulley flank surfaces because, as is known, all V-belts shape their own flank angles after the initial run-in operation.

Although the invention has been described with reference to a specific example embodiment, it will be appreciated, that it is intended, to cover all modifications and equivalents within the scope of the appended claims.

What is claimed is:

1. An asymmetric V-belt drive unit, comprising an asymmetric input V-belt pulley (1) and an asymmetric output V-belt pulley(2), each pulley (1, 2) having a rotational axis and first and second flanks substantially facing each other in each pulley, each first pulley flank (3, 6) having a given small first sloping pulley flank angle relative to a direction extending radially to the rotational axis, each second flank (4, 7) having a second sloping pulley flank angle larger than said given small first sloping pulley flank angle, said first and second sloping pulley flank angles of the V-belt pulley being smaller by at least one degree than a respective sloping angle of a V-belt for said drive unit, wherein said first sloping pulley flank angle of the input V-belt pulley (1) differs from the first sloping pulley flank angle of the output V-belt pulley (2), wherein said second sloping pulley flank angle of the input V-belt pulley (1) also differs from the second sloping pulley flank angle of the output V-belt pulley (2), wherein each V-belt pulley (1, 2) has an opening angle corresponding to the sum of the first and second pulley flank angles of the respective V-belt pulley, and wherein said opening angles are at least equal to each other or the opening angle of the output V-belt pulley (2) is larger than the opening angle of the input V-belt pulley (1).

2. The asymmetric V-belt drive unit of claim 1, wherein the small first sloping pulley flank angle of the input pulley (1) is 3°, wherein the second sloping pulley flank angle of the input pulley (1) is 17°, wherein the first sloping pulley flank angle of the output pulley (2) is 2°, and wherein the second sloping pulley flank angle of the output pulley (2) is 18°, whereby all pulley flank angles are measured relative to a radial line extending perpendicularly to the rotational axis of the respective pulley.

3. The asymmetric V-belt drive unit of claim 1 or 2, further comprising a V-belt including high tensile strength longitudinally extending reinforcing insert means (15, 16) made of high strength synthetic material.

4. The asymmetric V-belt drive unit of claim 3, wherein said synthetic material is Kevlar (RTM).

5. The asymmetric V-belt drive unit of claim 1, wherein said first sloping pulley flank angles of the input and output pulley (1, 2) are within a range of 1° to 3°, wherein a respective flank angle (α) of the V-belt is within a range of 3° to 5°, wherein the second sloping pulley flank angles of the input and output pulley are within a range of 17° to 18°, and wherein the respective flank angle (β) of the V-belt is within a range of 18° to 19°.

6. The asymmetric V-belt drive unit of claim 1, wherein at least the second flank angle of the output pulley (2) is larger than the second flank angle of the input pulley (1).

7. An asymmetric V-belt drive unit, comprising an asymmetric input V-belt pulley (1) and an asymmetric output V-belt pulley (2), each pulley having a rotational axis and first and second flanks substantially facing each other in each pulley, each first flank having a given small first sloping flank angle relative to a direction extending radially to the rotational axis, each second flank having a sloping second flank angle larger than said given small sloping angle, a V-belt (11) operatively interconnecting said input pulley (1) and said output pulley (2), said V-belt (11) including high tensile strength, longitudinally extending reinforcing insert means (15, 16) made of high strength synthetic material, such as Kevlar (RTM), wherein said first sloping flank angle of the input V-belt pulley (1) differs from the first sloping flank angle of the output V-belt pulley (2), wherein said second sloping flank angle of the input V-belt pulley (1) also differs from the second sloping flank angle of the output V-belt pulley (2), wherein each V-belt pulley (1, 2) has an opening angle corresponding to the sum of the first and second flank angles of the respective V-belt pulley, and wherein said opening angles are at least equal to each other or the opening angle of the output V-belt pulley (2) is larger than the opening angle of the input V-belt pulley (1), and wherein said first sloping flank angle of the input pulley (1) and of the output pulley (2) is within the range of 1° to 3°, wherein the respective flank angle (α) of the V-belt (11) is within the range of 3° to 5°, wherein the second sloping flank angle of the input pulley (1) and of the output pulley (2) is within the range of 17° to 18°, and wherein the respective flank angle (β) of the V-belt (11) is within the range of 18° to 19°, whereby the first and second sloping angles of the input and output pulleys are selected to be smaller by at least about 1° than the respective flank angles (α and β) of said V-belt (11) so that the angles (α and β) of said V-belt (11) are both selected to be larger by at least about 1° than the respective pulley flank angles.

8. The asymmetric V-belt drive unit of claim 7, wherein at least the second flank angle of the output pulley (2) is larger than the second flank angle of the input pulley (1).

* * * * *

UNITED STATES PATENT AND TRADEMARK OFFICE
CERTIFICATE OF CORRECTION

PATENT NO. : 4,473,367

DATED : September 25, 1984

INVENTOR(S) : Hans Wiegelmann

It is certified that error appears in the above-identified patent and that said Letters Patent is hereby corrected as shown below:

In the Abstract, line 5, "the" should read -- The --.

Column 5, line 3, "pulley", second occurrence, should read -- pulleys --.

Signed and Sealed this

Fourth Day of June 1985

[SEAL]

Attest:

DONALD J. QUIGG

Attesting Officer     Acting Commissioner of Patents and Trademarks